United States Patent
Yang et al.

(10) Patent No.: US 8,924,514 B2
(45) Date of Patent: Dec. 30, 2014

(54) METHOD OF PERFORMING SERVICE GROUP OWNER TRANSFER PROCEDURE IN COMMUNICATION SYSTEM

(75) Inventors: Ju-Ting Yang, Taoyuan County (TW); Yin-Yeh Tseng, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 300 days.

(21) Appl. No.: 13/283,617

(22) Filed: Oct. 28, 2011

(65) Prior Publication Data

US 2012/0110137 A1    May 3, 2012

Related U.S. Application Data

(60) Provisional application No. 61/408,117, filed on Oct. 29, 2010.

(51) Int. Cl.
*G06F 15/16* (2006.01)
*H04W 4/08* (2009.01)
*H04W 8/18* (2009.01)

(52) U.S. Cl.
CPC ............. *H04W 4/08* (2013.01); *H04W 8/186* (2013.01)
USPC ........... 709/219; 709/216; 709/217; 709/220; 709/225

(58) Field of Classification Search
CPC .................................. H04L 41/00; H04L 51/00
See application file for complete search history.

(56) References Cited

U.S. PATENT DOCUMENTS

| 7,162,476 B1* | 1/2007 | Belair et al. ........................... 1/1 |
| 8,412,892 B2* | 4/2013 | Watanabe et al. ............. 711/154 |
| 2006/0149701 A1* | 7/2006 | Putzolu ............................. 707/1 |
| 2010/0284390 A1* | 11/2010 | Lee et al. ....................... 370/338 |
| 2011/0090886 A1* | 4/2011 | Park et al. ...................... 370/338 |

FOREIGN PATENT DOCUMENTS

| CN | 1505788 A | 6/2004 |
| EP | 1 478 134 A1 | 11/2004 |
| KR | 1020100053714 A | 5/2010 |
| WO | 2010050643 A1 | 5/2010 |

OTHER PUBLICATIONS

"Converged Personal Network Service Requirements"—Open Mobile Alliance, Nov. 2009 http://technical.openmobilealliance.org/Technical/release_program/docs/CPNS/V1_0-20091117-C/OMA-RD-CPNS-V1_0-20091117-C.pdf.*

Notice of allowance mailed on May 27, 2013 for the Korean application No. 10-2011-0112217, filing date Oct. 31, 2011, pp. 1-2.

(Continued)

*Primary Examiner* — Randy Scott
(74) *Attorney, Agent, or Firm* — Winston Hsu; Scott Margo

(57) ABSTRACT

A method of performing a Service Group Owner Transfer procedure in a communication system is disclosed. The method comprises transmitting a SG Owner transfer request message from a first PNE to a CPNS Server, and from the CPNS Server to a second PNE; and transmitting a SG owner transfer response message from the second PNE to the CPNS Server, or from the CPNS Server to the first PNE; wherein the SG Owner transfer request message comprises at least one information element (IE) of a first PNE ID, a first PN ID, an first SG ID, a CandidatePNE ID and a reason to change, or the Response message comprises at least one IE of an Accept, a second PNE ID, a second PN ID and a second SG ID.

13 Claims, 4 Drawing Sheets

(56) References Cited

OTHER PUBLICATIONS

OMA-RD-CPNS-V1_0-20091117-C "Converged Personal Network Service Requirements", Nov. 2009.
OMA-TS-CPNS_Core-V1_0-20101025-D "Converged Personal Network Service Core Technical Specification", Oct. 2010.
European patent application No. 11008648.5, European Search Report mailing date: Jan. 5, 2012.
Rachelle Yang et al., "SG Owner Management, Service Group Owner Transfer", Open Mobile Alliance, OMA-TS-CPNS_Core-V1_0-20100618-D, Oct. 8, 2010, XP-002665860, p. 1-4.
Rachelle Yang et al., "SG Owner Transfer Message", Open Mobile Alliance, OMA-TS-CPNS_Core-V1_0-20100618-D, Nov. 16, 2010, XP-002665861, p. 1-4.
Rachelle Yang et al., SG Owner Management Service Group Owner Transfer, OMA-CD-CPNS-2010-0245R03-CR_SG_Owner_Management Change Request, Open Mobile Alliance, Oct. 8, 2010, p. 1-4.
Office action mailed on Dec. 10, 2013 for the China application No. 201110337156.5, filing Oct. 31, 2011.

* cited by examiner

METHOD OF PERFORMING SERVICE GROUP OWNER TRANSFER PROCEDURE IN COMMUNICATION SYSTEM

CROSS REFERENCE TO RELATED APPLICATIONS

This application claims both the benefit of U.S. Provisional Application No. 61/408,117, filed on Oct. 29, 2010, entitled "Message Content and Format of Service Group Owner Transfer Message in CPNS", the contents of which are incorporated herein in their entirety.

BACKGROUND OF THE INVENTION

1. Field of the Invention

The present invention relates to a method used in a communication system and related communication device, and more particularly, to a method of performing a Service Group (SG) Owner Transfer procedure in a communication system and related communication device.

2. Description of the Prior Art

The Open Mobile Alliance (OMA) is founded to develop OMA specifications for mobile services to meet users' needs. Furthermore, the OMA specifications aim to provide the mobile services which are interoperable across geographic areas (e.g. countries), operators, service providers, networks, operation systems and mobile devices. In detail, the mobile services conforming to the OMA specifications can be used by the users without restriction to particular operators and service providers. The mobile services conforming to the OMA specifications are also bearer agnostic, i.e., the bearer that carries the mobile services can be a second generation (2G) mobile system such as GSM, EDGE or GPRS, or a third generation (3G) and beyond mobile system such as UMTS, LTE or LTE-Advanced. Further, the mobile services can be executed on an operation system such as Windows, Android or Linux operated on various mobile devices. Therefore, industries providing devices or the mobile services supporting the OMA specifications can benefit from a largely growing market enabled by interoperability of the mobile services. Besides, the users use the devices or the mobile services supporting the OMA specifications can also have a better experience due to the interoperability of the mobile services.

Furthermore, Converged Personal Network Services (CPNS) is developed by the OMA to provide application-layer support for ubiquitous access to services in a converged network, which is a group of Personal Networks (PNs) that are interconnected by PN Gateways (PN GWs). In detail, a basic architecture of the CPNS includes three entities which are a CPNS server, a PN GW, and one or more PN elements (PNEs), but there maybe several PN GWs or even several CPNS servers, or even service provider servers in other architectures of the CPNS. The CPNS server receives requests from the PN GW, and replies responses to the PN GW, to ensure that appropriate applications are selected and appropriate contents are provided to the PNEs via the PN GW. The PN GW serves as an intermediary entity between the PNEs and other networks that forwards the requests and the responses between the PNEs and the other networks. The PN GW can be a mobile phone, or an IP-enabled set-top box. Besides, the PNEs are PN entities that are connected to the PN GW and between each other, and are used for rendering the content received from the PN GW or from each other. The PNE can be a mobile phone, a personal computer (PC), a music player, a car navigation system or an IP-enabled set-top box. For example, a PN GW can be a mobile phone which integrates a Bluetooth network and a cellular network. In this situation, a PNE which is a Personal Media Player (PMP) connected to the Bluetooth network can receive video contents from the Internet via the mobile phone connected to the cellular network.

On the other hand, the OMA develops a concept of service group (SG) for the CPNS. The SG is composed of one or more PN GWs and one or more PNEs, which are necessary for the SG to operate normally. The intention of the service group is to group together PNEs which want to receive the same service from a CPNS server or a content provider. In other words, for those PNEs that want to receive a game service can belong to a SG receiving the game service, and for those PNEs that want to receive a music service can belong to a SG receiving the music service. Besides, a PNE creating a SG is assigned as a SG Owner. The SG owner possesses the ownership of the SG for managing the SG by inviting a new SG member, expelling a SG member, deleting the SG, etc. Further, a PNE belonging to the SG can leave the SG or abandons to be the owner by sending a SG Leave Request to a corresponding CPNS server via a PN GW managing the PNE.

Under some circumstance, the SG may not operate normally. In one case, when the SG owner leaves the SG, the SG can not be managed and SG will no longer function as expected. In another case, when the SG owner stays in the SG, however, the SG owner does not want to serve as the SG Owner anymore, which results in defective SG functionality. Therefore, a Service Group Owner Transfer procedure is provided to transfer SG ownership from an original SG owner to a new SG owner. However, detailed content and format of messages of the Service Group Owner Transfer procedure is not yet specified.

SUMMARY OF THE INVENTION

The invention therefore provides a method of performing a Service Group (SG) Owner Transfer procedure in a communication system and related communication device.

A method of performing a Service Group (SG) Owner Transfer procedure in a communication system is disclosed. The method comprises transmitting a SG Owner transfer request message from a first personal network element (PNE) to a first personal network (PN) gateway (GW), from the first PN GW to a Converged Personal Network Service (CPNS) Server, from the CPNS Server to a second PN GW, and from the second PN GW to a second PNE; and transmitting a SG owner transfer response message from the second PNE to the second PN GW, from the second PN GW to the CPNS Server, from the CPNS Server to the first PN GW, and from the first PN GW to the first PNE; wherein the SG Owner transfer request message comprises at least one information element (IE) of a first PNE ID, a first PN ID, an first SG ID, a CandidatePNE ID and a reason to change, or the Response message comprises at least one IE of an Accept, a second PNE ID, a second PN ID and a second SG ID.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
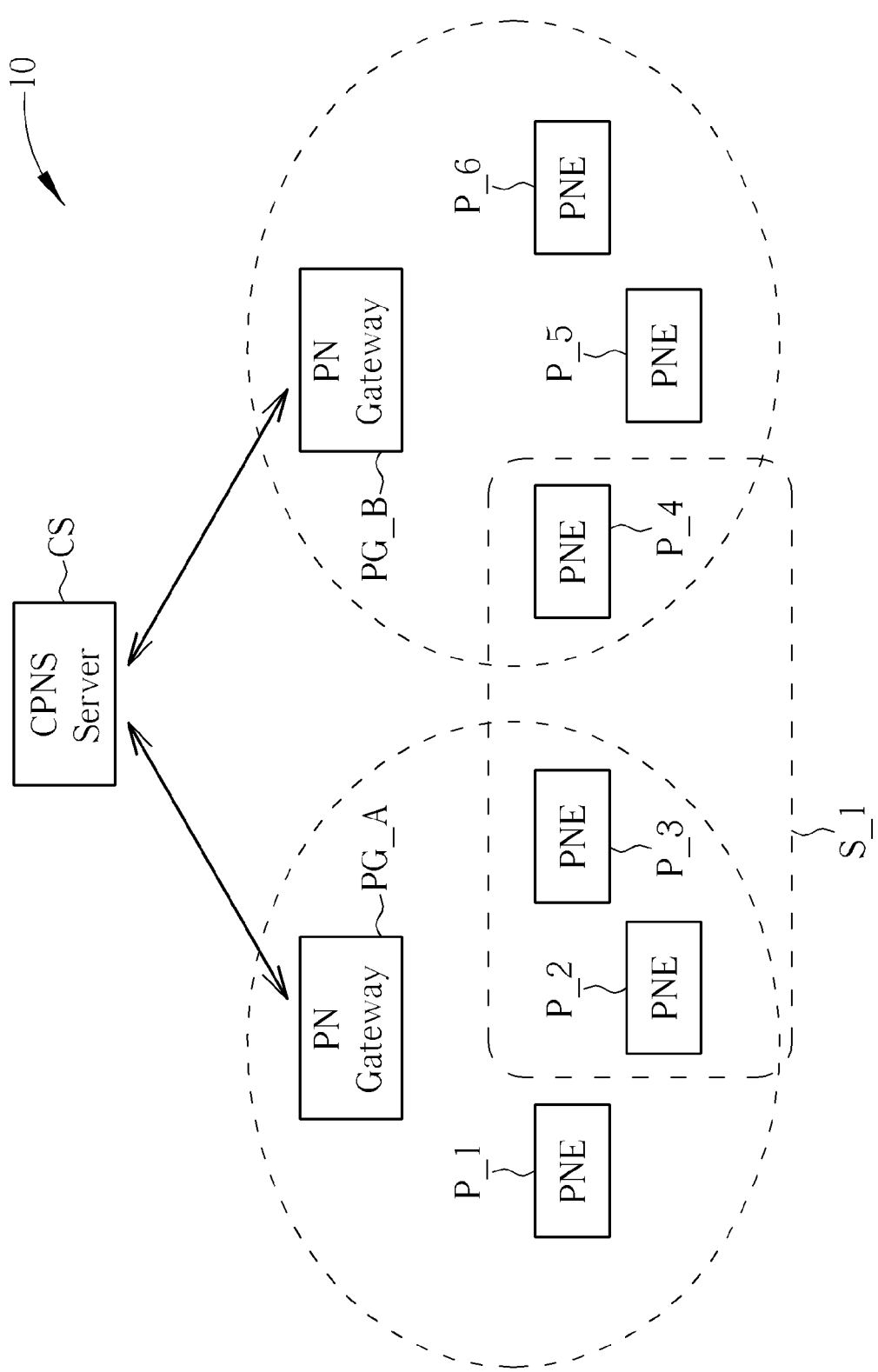
FIG. 1 is a schematic diagram of an exemplary communication system according to the present invention.

Please refer to FIG. 1, which is a schematic diagram of a communication system 10 according to an example of the present invention. The communication system 10 supports Converged Personal Network Services (CPNS) developed by the Open Mobile Alliance (OMA). The communication system 10 is briefly composed of a CPNS server CS, PN gateways (PN GWs) PG_A and PG_B, and PN elements (PNEs) P_1-P_6. In practice, an amount of the PN GWs is not limited to two, and an amount of the PNEs managed by each PN GW is also not limited to three.

In detail, in the communication system 10, the CPNS server CS receives requests from a PN GW, and replies responses to the PN GW, to ensure that appropriate applications are selected and appropriate contents are provided to a PNE managed by the PN GW. A PN GW (e.g. PN GW PG_A or PN GW PG_B) serves as an intermediary entity between the PNE and other networks that forwards the requests and the responses between the PNE and the other networks. In the communication system 10, the PNEs P_1-P_3 are managed by the PN GW PG_A, and the PNEs P_4-P_6 are managed by the PN GW PG_B. In other words, the PN GW PG_A forwards requests, responses and services between the PNEs P_1-P_3 and the CPNS server CS. Similarly, the PN GW PG_B forwards requests, responses and services between the PNEs P_4-P_6 and the CPNS server CS. Preferably, the PN GW can be a mobile phone, or an IP-enabled set-top box. The PNE (e.g. any one of the PNEs P_1-P_6) is a PN entity that is connected to a corresponding PN GW managing the PNE and between each other, and is used for rendering the content received from the corresponding PN GW or from each other. The PNE can be a mobile phone, a personal computer (PC), a music player, a car navigation system or an IP-enabled set-top box. Besides, PNEs P_2-P_4 in the communication system 10 belong to a service group (SG) S_1. Therefore, the PNEs P_2-P_4 can receive the same service (e.g. a game service or a music service) from the CPNS server CS or a content provider. Without loss of generality, the PNE P_2 is assumed as the SG owner of the SG S_1, and possesses the ownership of the SG S_1 for managing the SG S_1 by inviting a new SG member, expelling a SG member, deleting the SG S_1, etc.

Figure 2:
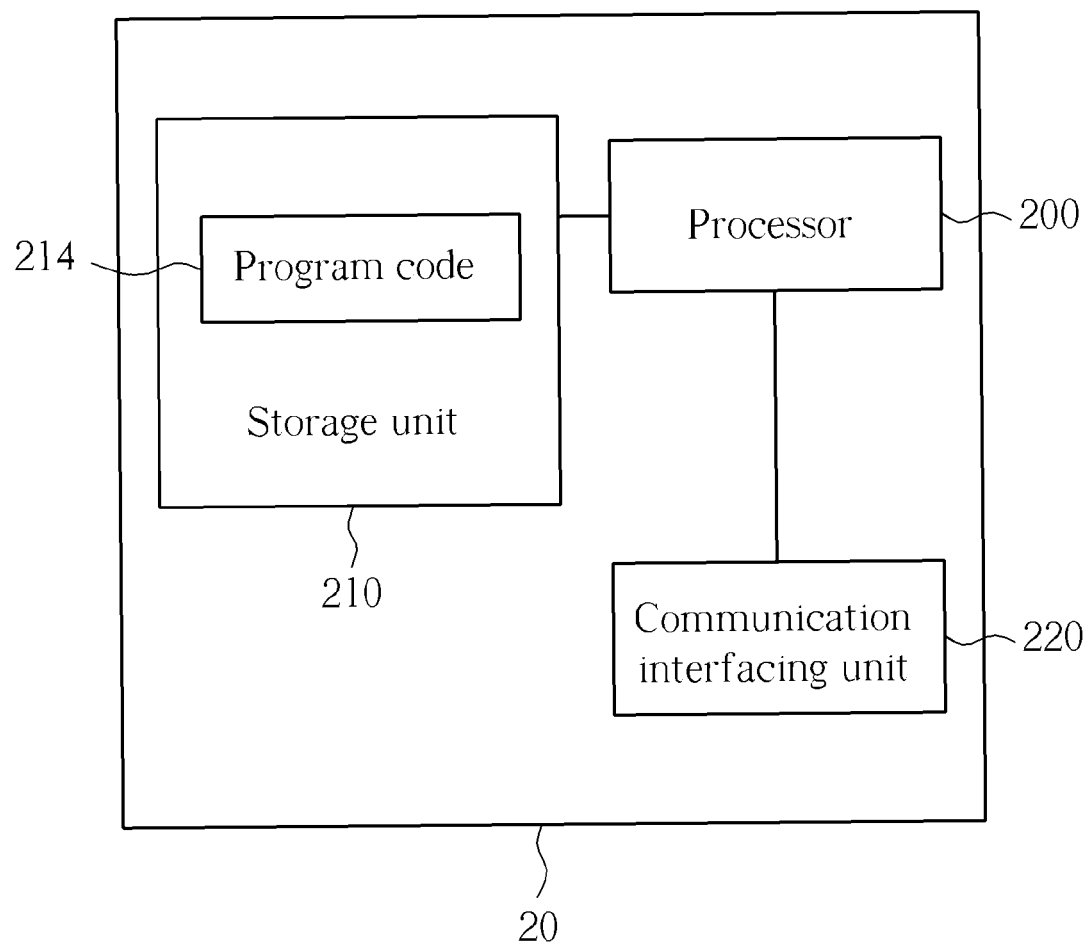
FIG. 2 is a schematic diagram of an exemplary communication device according to the present invention.

Please refer to FIG. 2, which is a schematic diagram of a communication device 20 according to an example of the present invention. The communication device 20 can be any one of the CPNS server CS, the PN GWs PG_A and PG_B, and the PNEs P_1-P_6 shown in FIG. 1, but is not limited herein. The communication device 20 may include a processor 200 such as a microprocessor or Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a transceiver and can exchange signals with the server according to processing results of the processor 200.

Figure 3:
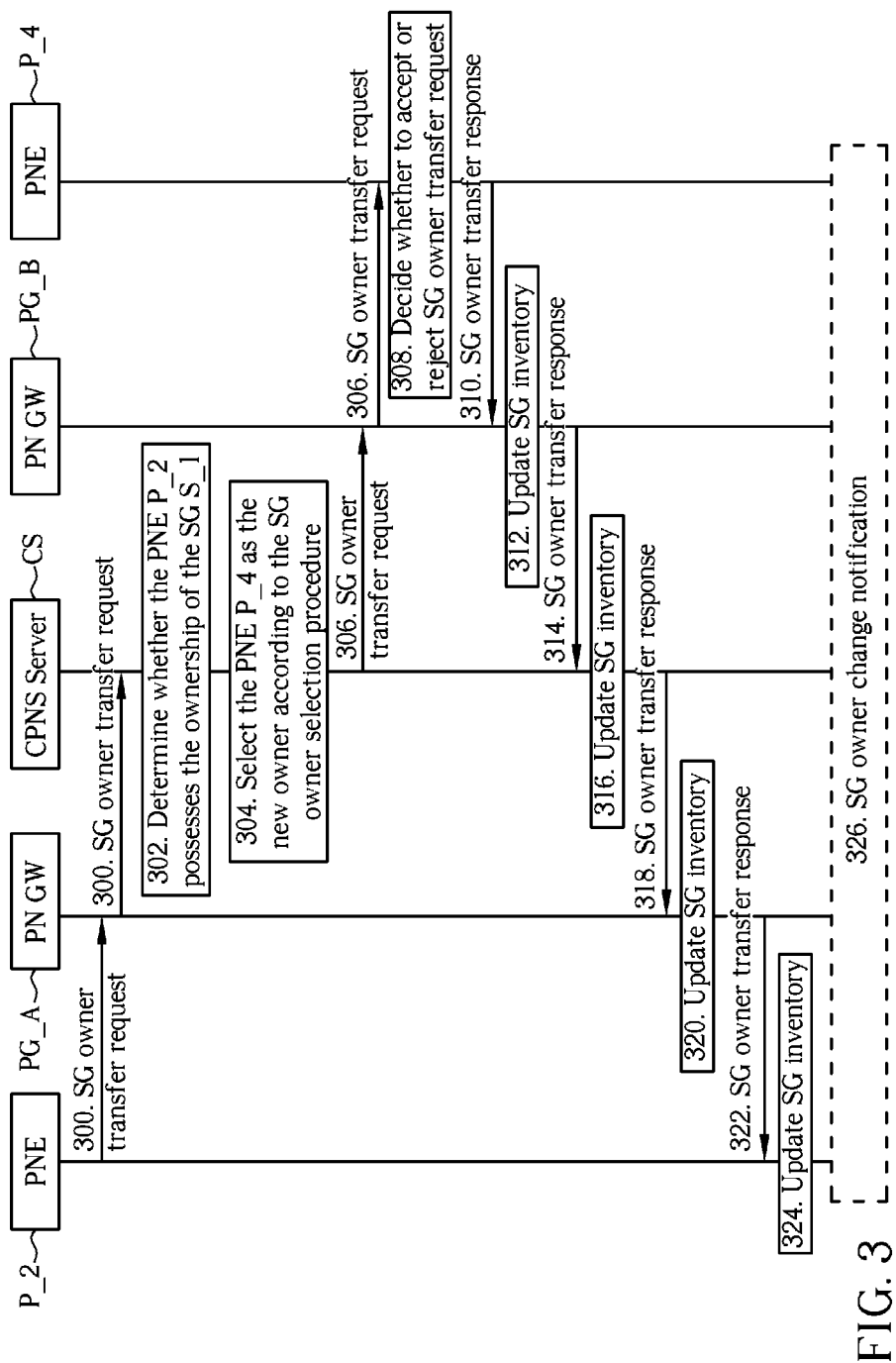
FIG. 3 is a transmission sequence diagram of a Service Group Owner Transfer procedure.

Please refer to FIG. 3, which is a transmission sequence diagram of a Service Group Owner Transfer procedure 30. The Service Group Owner Transfer procedure 30 is utilized in the communication system 10 shown in FIG. 1. The Service Group Owner Transfer procedure 30 may be compiled into the program code 214 and includes the following steps:

Step 300: The PNE P_2 transmits a SG Owner transfer request message to the PN GW PG_A, and the PN GW PG_A forwards the SG owner transfer request message to the CPNS server CS.

Step 302: The CPNS server CS determines whether the PNE P_2 possesses the ownership of an SG S_1.

Step 304: The CPNS server CS selects the PNE P_4 as the new owner according to the SG owner selection procedure. The suggested candidate SG owner provided in SG owner transfer request message is also taken into consideration.

Step 306: The CPNS server CS forwards the SG owner transfer request message to the PNE P_4 via the PN GW PG_B.

Step 308: The PNE P_4 decides whether to accept or reject the SG owner transfer request message.

Step 310: The PNE P_4 transmits a SG owner transfer response message to the PN GW PG_B.

Step 312: The PN GW PG_B updates SG inventory.

Step 314: The PN GW PG_B transmits the SG owner transfer response message to the CPNS server CS.

Step 316: The CPNS server CS updates SG inventory.

Step 318: The CPNS server CS transmits the SG owner transfer response message to the PN GW PG_A.

Step 320: The PN GW PG_A updates SG inventory.

Step 322: The PN GW PG_A transmits the SG owner transfer response message to the PNE P_2.

Step 324: The PNE P_2 updates SG inventory.

Step 326: The CPNS server CS broadcasts a SG owner change notification in the SG S_1.

However, the Service Group Owner Transfer procedure 30 does not specify content and format of the SG Owner transfer request message and the SG owner transfer response message and related operations.

Figure 4:
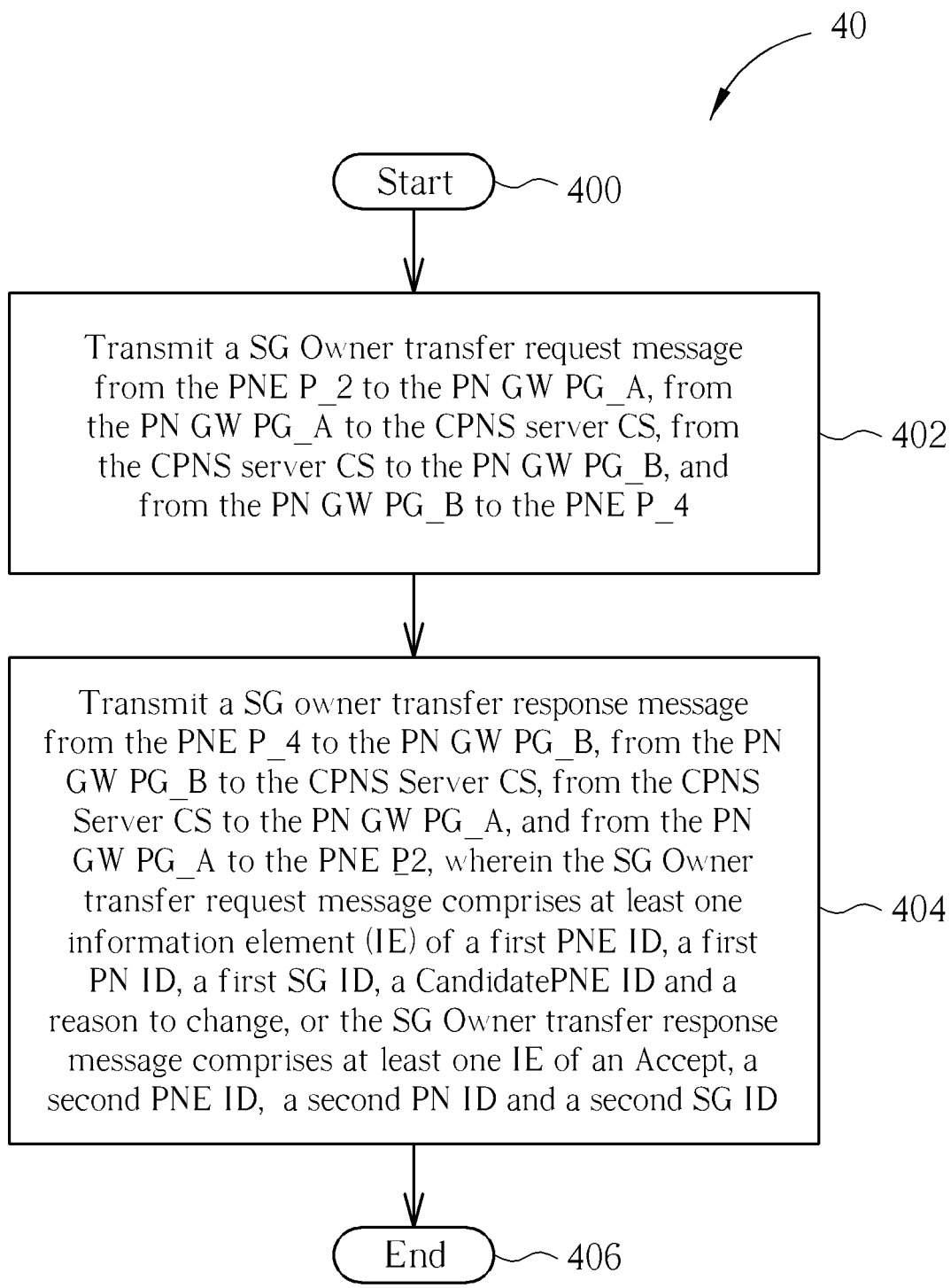
FIG. 4 is a flowchart of an exemplary process according to the present invention.

Under such a situation, please refer to FIG. 4, which is a flowchart of a process 40 according to an example of the present invention. The process 40 is utilized in PNEs, PN GWs or a CPNS Server of the communication system 10 shown in FIG. 1, to perform a Service Group Owner Transfer procedure. The process 40 may be compiled into the program code 214 and includes the following steps:

Step 400: Start.

Step 402: Transmit a SG Owner transfer request message from the PNE P_2 to the PN GW PG_A, from the PN GW PG_A to the CPNS server CS, from the CPNS server CS to the PN GW PG_B, and from the PN GW PG_B to the PNE P_4.

Step 404: Transmit a SG owner transfer response message from the PNE P_4 to the PN GW PG_B, from the PN GW PG_B to the CPNS Server CS, from the CPNS Server CS to the PN GW PG_A, and from the PN GW PG_A to the PNE P_2, wherein the SG Owner transfer request message comprises at least one information element (IE) of a first PNE ID, a first PN ID, a first SG ID, a CandidatePNE ID and a reason to change, or the SG Owner transfer response message comprises at least one IE of an Accept, a second PNE ID, a second PN ID and a second SG ID.

Step 406: End.

According to the process 40, when the communication system 10 transmits a Request message from the PNE P_2 to the PN GW PG_A (e.g. step 300), from the PN GW PG_A to the CPNS server CS (e.g. step 302), from the CPNS server CS to the PN GW PG_B (e.g. step 306), or from the PN GW PG_B to the PNE P_4 (e.g. step 306), wherein the PNE P_2 is an original SG owner of the SG S_1, the SG Owner transfer request message comprises at least one information element (IE) of a first PNE ID, a first PN ID, a first SG ID, a CandidatePNE ID and a reason to change. Please note that, the PNE P_2 and the PNE P_4 belong to different PN GWs in this embodiment. However, it may happen that the CPNS server CS selects the PNE P_3 as the new owner according to the SG owner selection procedure, i.e., the owner and the new owner belong to the same PN GW. In this situation, the process 40 directly applies, i.e. the SG Owner transfer request message is transmitted from the PNE P_2 to the PN GW PG_A, from the PN GW PG_A to the CPNS server CS, from the CPNS server CS to the PN GW PG_A, and from the PN GW PG_A to the PNE P_3, and the SG owner transfer response message from the PNE P_3 to the PN GW PG_A, from the PN GW PG_A to the CPNS Server CS, from the CPNS Server CS to the PN GW PG_A, and from the PN GW PG_A to the PNE P_2, wherein the PN GW PG_A corresponding to the PNE P_2 and the PN GW PG_A corresponding to the PNE P_3 are identical.

The first PN ID is a PN identification of the original SG owner, i.e. the PNE P_2. The first PNE ID is a PNE identification of the original SG owner. The first SG ID is a service group identification of the original SG owner. The CandidatePNE ID is a PNE identification of a candidate PNE of a new SG Owner if the original SG owner recommends or requests the candidate PNE to be the new SG Owner, e.g. the PNE P_2 recommends the PNE P_4. The reason to change indicates a reason of the Service Group Owner Transfer procedure if the original SG owner provides the reason, e.g. low power, leave the SG S_1, low capabilities, etc.

Under such a situation, when the PNE P_2 intends to abandon the ownership of the SG S_1, the PNE P_2 transmits the SG owner transfer request message, which comprises the first PNE ID, the first PN ID, the first SG ID, the CandidatePNE ID and the reason to change, to the PN GW PG_A which manages the PNE P_2 (e.g. step 300). Then, the PN GW PG_A forwards the SG owner transfer request message to the CPNS server CS (e.g. step 300). After receiving the SG owner transfer request message from the PN GW PG_A, the CPNS server CS determines whether the PNE P_2 possesses the ownership of the SG S_1 according to the first PNE ID, the first PN ID and the first SG ID (e.g. step 302), to avoid that the ownership is transferred accidentally due to a fake request transmitted by a hostile PNE. If the CPNS server CS confirms that the PNE P_2 possesses the ownership of the SG S_1, the CPNS server CS starts to select a new owner from the PNEs P_3-P_4 of the SG S_1 according to a SG owner selection procedure, which considers capability of a PNE, choice of the CPNS server CS, service description, operator's policy of the CPNS server CS, the CandidatePNE ID and the reason to change. Without loss of generality, the PNE P_4 is assumed to be selected as the new owner according to the SG owner selection procedure, the CandidatePNE ID and the reason to change (e.g. step 304). Then, the CPNS server CS forwards the SG owner transfer request message to the PNE P_4 via the PN GW PG_B which manages the PNE P_4 (e.g. step 306). Further, the PNE P_4 decides whether to accept the ownership of the SG S_1 or not (e.g. step 308), after receiving the SG owner transfer request message. As a result, content and format of the SG owner transfer request message and related operations are specified.

On the other hand, when the communication system 10 transmits a SG owner transfer response message from the PNE P_4 to the PN GW PG_B (e.g. step 310), from the PN GW PG_B to the CPNS Server CS (e.g. step 314), from the CPNS Server CS to the PN GW PG_A (e.g. step 318), and from the PN GW PG_A to the PNE P_2 (e.g. step 322), the SG owner transfer response message comprises at least one IE of an Accept, a second PNE ID, a second PN ID and an second SG ID. The Accept indicates whether the service group owner transfer is successful and the PNE P_4 accepts to be a new SG owner, e.g. if the PNE P_4 accepts the SG owner transfer, a value of the Accept is "TRUE"; otherwise "FALSE". The second PN ID is a PN identification of the new SG owner if the Accept indicates the service group owner transfer is successful and the PNE P_4 accepts to be the new SG owner, e.g. the Accept is "TRUE". The second PNE ID is a PNE identification of the new SG owner if the Accept indicates the service group owner transfer is successful and the PNE P_4 accepts to be the new SG owner, e.g. the Accept is "TRUE". The second SG ID is a service group identification of the new SG owner if the Accept indicates the service group owner transfer is successful and the PNE P_4 accepts to be the new SG owner, e.g. the Accept is "TRUE".

Under such a situation, if the PNE P_4 accepts the ownership of the SG S_1, the PNE P_4 transmits a SG owner transfer response message, comprising the Accept, the second PNE ID, the second PN ID and the second SG ID, to the CPNS server CS to indicate acceptance of the ownership of the SG S_1 with the Accept, e.g. "TRUE", via the PN GW PG_B (e.g. steps 310, 314). After confirming the acceptance of the ownership of the SG D_1, the CPNS server CS forwards the SG owner transfer response message to the PNE P_2 via the PN GW PG_A (e.g. steps 318, 322), to indicate that the ownership of the SG S_1 has been transferred. Further, the CPNS server CS broadcasts a SG owner change notification in the SG S_1 to notify each PNE of the SG SG_1 that the ownership of the SG S_1 is transferred to the PNE P_4 (e.g. step 326).

On the other hand, if the PNE P_4 rejects the ownership of the SG S_1, the PNE P_4 transmits a SG owner transfer response message to the CPNS server CS to indicate rejection of the ownership of the SG S_1 with the Accept, e.g. "FALSE", via the PN GW PG_B (e.g. steps 310, 314). In this situation, the ownership is not transferred, and the PNE P_2 remains the owner of the SG S_1. As a result, content and format of the SG owner transfer response message and related operations are specified. Therefore, when the PNE P_2 intends to abandon the ownership of the SG S_1, the communication system 10 can transmit the SG Owner transfer request message and the SG owner transfer response message and operate accordingly to transfer the ownership, such that the SG S_1 can continue to operate normally.

Moreover, for the communication system 10 to operate normally, entities related to operation of the SG S_1 such as the CPNS server CS, the PN GWs PG_A and PG_B and the PNEs P_2-P_4, should maintain their SG inventories corresponding to the SG S_1 locally. In other words, the entities should maintain their SG inventories to record related information, such as the owner of the SG S_1. Therefore, when a PNE leaves/joins the SG S_1, or the owner of the SG S_1 is changed, the entities updates their SG inventories accordingly. For example, the CPNS server CS, the PN GWs PG_A and PG_B, and the PNE P_4 update their SG inventories after receiving the Accept of the SG owner transfer response message indicating the acceptance of the ownership of the PNE P_4 (steps 312, 316, 320, 324). In short, the entities related to the SG S_1 update their SG inventories when the ownership is transferred. The methods according to which the entities confirm that the ownership is transferred are not limited herein.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In the prior art, content and format of the SG Owner transfer request message and the SG owner transfer response message and related operations of a Service Group Owner Transfer procedure is not specified. In comparison, the present inventions specifies content and format of the SG Owner transfer request message and the SG owner transfer response message and related operations of a Service Group List Discovery procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing a Service Group (SG) Owner Transfer procedure in a communication system, the method comprising:

transmitting a SG Owner transfer request message from a first personal network element (PNE) to a first personal network (PN) gateway (GW), from the first PN GW to a Converged Personal Network Service (CPNS) Server, from the CPNS Server to a second PN GW, and from the second PN GW to a second PNE, to request to perform transfer SG ownership, wherein an original SG with an original SG owner comprises the first PNE; and transmitting a SG owner transfer response message from the second PNE to the second PN GW, from the second PN GW to the CPNS Server, from the CPNS Server to the first PN GW, and from the first PN GW to the first PNE, to respond to the SG Owner transfer request message;

wherein the SG Owner transfer request message comprises at least one information element (IE) of a first PNE ID, a first PN ID, a first SG ID, a CandidatePNE ID and a reason to change, or the SG Owner transfer response message comprises at least one IE of an Accept, a second PNE ID, a second PN ID and a second SG ID.

2. The method of claim 1, wherein the first PN GW and the second PN GW are identical.

3. The method of claim 1, wherein the CPNS Server selects the second PNE as an owner according to a SG owner selection procedure with considering a suggested candidate SG owner provided in the SG Owner transfer request message.

4. The method of claim 1, wherein the first PNE is the original SG owner of the original SG.

5. The method of claim 1, wherein the first PN ID is a PN identification of the original SG owner.

6. The method of claim 1, wherein the first PNE ID is a PNE identification of the original SG owner.

7. The method of claim 1, wherein the first SG ID is a service group identification of the original SG owner.

8. The method of claim 1, wherein the CandidatePNE ID is a PNE identification of a candidate PNE of a new SG Owner if the original SG owner recommends or requests the candidate PNE to be the new SG Owner.

9. The method of claim 1, wherein the reason to change indicates a reason of the Service Group Owner Transfer procedure if the original SG owner provides the reason.

10. The method of claim 1, wherein the Accept indicates whether the service group owner transfer is successful and the second PNE accepts to be a new SG owner.

11. The method of claim 10, wherein the second PN ID is a PN identification of the new SG owner if the Accept indicates the service group owner transfer is successful and the second PNE accepts to be the new SG owner.

12. The method of claim 10, wherein the second PNE ID is a PNE identification of the new SG owner if the Accept indicates the service group owner transfer is successful and the second PNE accepts to be the new SG owner.

13. The method of claim 10, wherein the second SG ID is a service group identification of the new SG owner if the Accept indicates the service group owner transfer is successful and the second PNE accepts to be the new SG owner.

* * * * *